Patented Sept. 18, 1951

2,568,580

UNITED STATES PATENT OFFICE 2,568,580

CONDENSATION PRODUCTS OF 4-AMINO-ANTIPYRINE AND THE CHLOROETHOXY BENZALDEHYDES

Gerald H. Coleman, Freeland, Mich., assignor to The Dow Chemical Company, Midland, Mich., a corporation of Delaware No Drawing. Application January 22, 1951, Serial No. 207,239

3 Claims. (Cl. 260—240)

The present invention relates to new compounds which are the condensation products of 4-aminoantipyrine with the chloroethoxy benzaldehydes of the formula

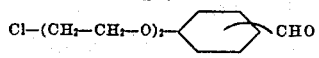

These new compounds are characterized by the following formula:

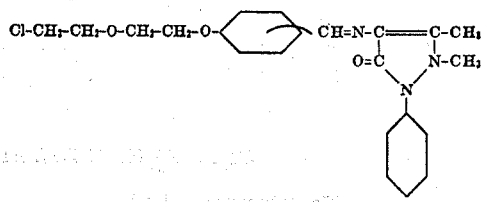

The novel compounds are crystalline solids, somewhat soluble in many organic solvents and substantially insoluble in water. They are of value as intermediates for the preparation of more complex organic derivatives, and as constituents of pharmaceutical compositions.

The chloroethoxy benzaldehydes as employed in the preparation of the compounds of the present invention contain two groups which may react with the aminoantipyrine, the halo and the aldehyde group. It has been found that the halo group, however, is of substantially lower reactivity than the aldehyde group, and that in the temperature range between about 10° and 125° C. the aldehyde group preferentially reacts with the aminoantipyrine with the elimination of water.

In practice, the reaction between the chloroethoxy benzaldehyde and aminoantipyrine is carried out at a temperature of from 10° to 125° C. The reaction is somewhat exothermic, and takes place at a rate which varies directly with the employed temperature. If desired, the condensation may be performed in an inert solvent such as carbon tetrachloride, benzene or ethanol. Good results are obtained when substantially equimolecular proportions of the reactants are employed. Upon completion of the reaction, the desired product may be separated by conventional methods such as washing with dilute aqueous mineral acids, ethanol and water, and recrystallization from organic solvents.

The chloroethoxy benzaldehydes employed as starting materials, as above described, may be prepared by reacting 2,2'-dichlorodiethyl ether and a suitable hydroxy benzaldehyde. In carrying out the reaction, substantially equimolecular proportions of the reactants are mixed together in water as a reaction solvent and the resulting mixture heated at the boiling temperature of the reaction mixture and under reflux for a period of time to complete the reaction. The crude mixture is then fractionally distilled under reduced pressure to obtain the desired product.

This application is a continuation in part of my copending application Serial No. 76,859, filed February 16, 1949.

*Example 1.*—N-(o-(2-(2-chloroethoxy)ethoxy)-benzylidene)-4-aminoantipyrine

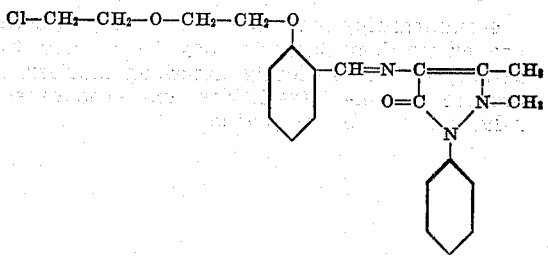

30.5 grams (0.15 mole) of 4-amino antipyrine was dissolved in 50 milliliters of 95 per cent ethanol and the resulting solution added with stirring to 34.3 grams (0.15 mole of o-(2-(2-chloroethoxy)ethoxy)benzaldehyde (having a boiling point of 183° to 185° C. at 5 millimeters pressure, a refractive index n/D of 1.5453 at 20° C. and a specific gravity of 1.2136 at 20°/4° C.). The reaction was exothermic and proceeded rapidly with the precipitation of yellow crystals of N-(o-(2-(2-chloroethoxy)ethoxy)benzylidine)-4-aminoantipyrine. This product was separated by filtration, washed with ethanol and air-dried to obtain 60.5 grams of a substantially pure material melting at 129.5°–131° C. and having a chlorine content of 8.5 per cent. The theoretical chlorine content of $C_{22}H_{24}ClN_3O_3$ is 8.59 per cent.

*Example 2.*—N-(p-(2-(2-chloroethoxy)ethoxy)-benzylidene)-4-aminoantipyrine

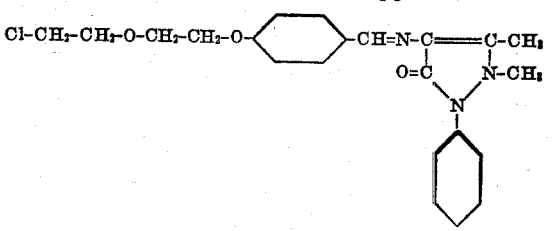

In a manner similar to that of Example 1, 30.5 grams (0.15 mole) of 4-aminoantipyrine dissolved in 50 milliliters of ethanol was reacted with 34.3 grams (0.15 mole) of p-(2-(2-chloroethoxy)ethoxy)-benzaldehyde (melting at 65.5° to 66° C.) dissolved in 150 milliliters of ethanol. The reaction product was diluted with 100 milliliters of water, the resulting mixture dividing into aqueous and oil layers. The oil layer was separated and solidified with stirring to give pale yellow crystals of N-(p-(2-(2-chloroethoxy)-ethoxy)benzylidene)-4-aminoantipyrine. This product was separated and washed with 50 per cent ethanol and air-dried to obtain 56.5 grams of a substantially pure material melting at 110° to 111° C. and having a chlorine content of 8.5 per cent. The theoretical chlorine content of $C_{22}H_{24}ClN_3O_3$ is 8.59 per cent.

*Example 3.—N-(m-(2-(2-chloroethoxy)ethoxy)-benzylidene)-4-aminoantipyrine*

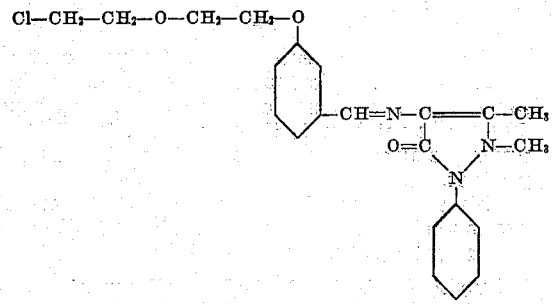

4-aminoantipyrine and m-(2-(2-chloroethoxy)ethoxy)benzaldehyde may be reacted together in the previously described manner to prepare N-(m-(2-(2-chloroethoxy)ethoxy)benzylidene)-4-aminoantipyrine.

I claim:
1. A compound having the formula

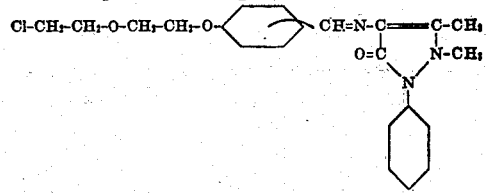

2. N-(p-(2-(2-chloroethoxy)ethoxy)benzylidene-4-aminoantipyrine of the formula

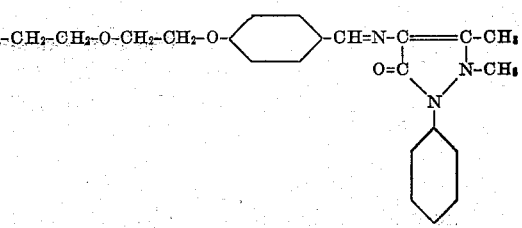

3. N-(o-(2-(2-chloroethoxy)ethoxy)benzylidene)-4-aminoantipyrine of the formula

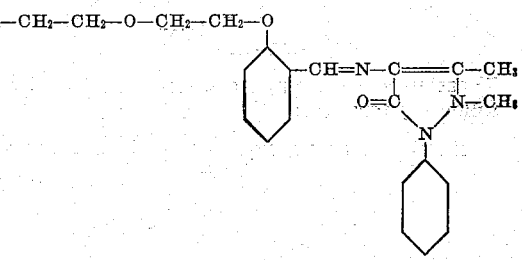

GERALD H. COLEMAN.

No references cited.